3,015,213
AIR HYDRAULIC BRAKE ACTUATOR
Darold A. Augustin, Elyria, Ohio, assignor to Bendix-Westinghouse Automotive Air Brake Company, Elyria, Ohio, a corporation of Delaware
Filed Sept. 13, 1957, Ser. No. 683,827
7 Claims. (Cl. 60—54.6)

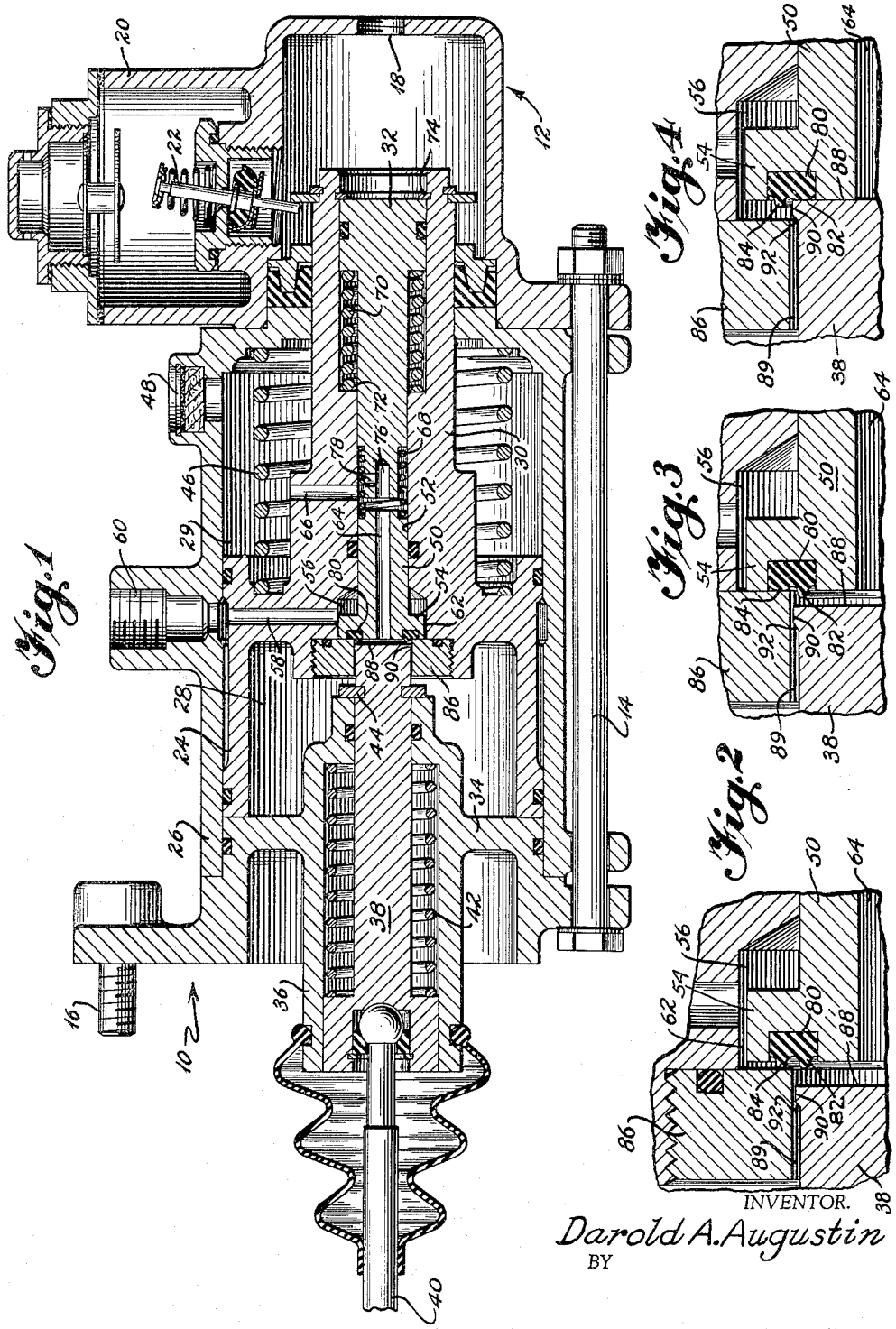

This invention relates to a power-assisted hydraulic actuator which is particularly adapted for use in connection with vehicle braking systems of the hydraulic type.

One of the objects of the present invention is to provide a novel brake actuator embodying a master cylinder and a compressed air operated motor, the construction being such that upon initial operation of the actuator sufficient to effect slight braking, the "feel" or reaction will be relatively low, this being followed by an increased reaction which is substantially proportional to the braking effort.

Another object of the invention is to provide in an actuator of the above type, a novel construction for ensuring a two-stage reaction or "feel," the first stage corresponding to a light braking effort and accompanied by a light reaction, and the second stage corresponding to an increased braking effort and accompanied by a substantially increased reaction.

A further object resides in the provision of a novel arrangement, in an actuator of the above type for enabling a smooth and graduated application of power, thus avoiding any tendency toward erratic operation or surging of the power unit when compressed air is initially supplied.

Still another object is to provide a novel and improved valve construction for the actuator which insures proper sealing of the parts during operation and which avoids any tendency toward leakage of compressed air.

A further object is to provide an actuator of the above type which includes a novel construction for ensuring manual operation of the brakes in the event of power failure.

Other objects and novel features of the invention will appear more fully hereinafter from a consideration of the following detailed description when taken in connection with the accompanying drawing illustrative of one form of the invention. It is to be expressly understood, however, that the drawing is utilized for purposes of illustration only and is not to be taken as a definition of the limits of the invention, reference being had for this purpose to the appended claims.

In the drawing, wherein similar reference characters refer to similar parts throughout the several views:

FIG. 1 is an axial sectional view of an air hydraulic brake actuator constructed in accordance with the present invention and illustrating the parts in released position, and FIGS. 2, 3 and 4 are enlarged fragmentary views in section of certain of the valve parts and resilient seal cooperating therewith.

Referring more particularly to FIG. 1, the improved actuator is illustrated therein as embodying a power actuator or cylinder 10 having a master cylinder 12 connected to the front end thereof, as by means of bolts 14, the actuator 10 being adapted to be mounted beneath the vehicle floor board by screws 16 and the master cylinder 12 being associated with the conventional hydraulic brake system through connection with the port 18. As shown, the master cylinder 12 is provided with the usual reservoir 20 and valve 22 which controls communication between the reservoir and cylinder.

In order to provide the braking pressure, the actuator 10 includes a piston 24 which is slideable within a cylinder 26 to provide a pressure chamber 28 and an atmospheric chamber 29 and the piston 24 has a hollow integral extension or sleeve 30 which projects into the cylinder 12 and which, together with a reaction plunger 32, provides a hydraulic piston for the master cylinder. Cylinder 26 is closed by an end cap 34 which is provided with a sleeve 36 for slideably receiving a manually operable solid plunger 38, the latter being connected through a link 40 with the usual foot pedal, not shown, and being normally urged to the position illustrated by a spring 42. A collar 44, carried by the plunger 38, provides a stop for limiting movement of the plunger 38 toward the left, as viewed in FIG. 1. A spring 46 within the chamber 29 normally serves to maintain the piston 24 in the released position shown and the chamber 29 is provided with a filtered opening 48 to atmosphere.

A novel control valve mechanism is provided for controlling the operation of the actuator 10 through movements of the plunger 38, and in the form shown includes a combined inlet and exhaust valve member or plunger 50 which is slideably mounted within a bore 52 of the piston sleeve 30. At its left end, the plunger 50 is enlarged to provide a valve head 54 positioned within an inlet chamber 56 which is in constant communication with a source of compressed air by way of bore 58 and port 60. Valve head 54 has a diameter less than that of the inlet chamber 56 to provide clearance 62 therearound, as clearly illustrated in FIGS. 2–4. Valve plunger 50 has an exhaust bore 64 therein which normally communicates with the atmospheric chamber 29 through a passage 66 in the sleeve 30, and the valve plunger is normally maintained in the exhaust position illustrated by means of a relatively light valve return spring 68 interposed between the plungers 50 and 32. A relatively strong spring 70, interposed between an abutment 72 in the sleeve 30 and the plunger 32 normally serves to maintain the latter against a stop ring 74, and in this position, the left end of the plunger 32 is spaced from the valve plunger 50. In order to ensure communication between the bore 64 and passage 66, even though the plungers 50 and 32 are in engagement, the left end of the plunger 32 is provided with a bore 76 and a lateral passage 78.

One of the important features of the invention resides in the sealing of the inlet and exhaust valves and in the graduation of air flow to the pressure chamber 28. More particularly, the valve head 54 is provided with a recess containing an annular resilient sealing member or valve seat 80 having a pair of annular concentric sealing ridges or projections 82 and 84. FIG. 2 illustrates the expanded condition of these ridges while FIG. 3 illustrates the normal position of the parts corresponding to the exhaust or released position of FIG. 1. In FIG. 3, it will be seen that the ridge 84, which functions as an inlet valve, is compressed and slightly flattened through engagement with an inlet valve seat 86 carried by the piston 24, and provides an efficient seal for normally preventing communication between the inlet chamber 56 and the pressure chamber 28. In like manner, as the plunger 38 is moved to the right, the end thereof forms an exhaust valve seat 88 which engages the ridge 82 which functions as an exhaust valve. From FIG. 4, it will be seen that when the ridge 82 is thus engaged, it will be compressed and somewhat flattened to seal the exhaust bore 64.

It will be noted from FIGS. 3 and 4 that when the ridges 84 and 82 are compressed and flattened, the valve seat 80 does not completely fill the recess in the valve head 54. This construction ensures a metal to metal contact between parts 86 and 54, as in FIG. 3, and a metal to metal contact between parts 88 and 54, as in FIG. 4 while maintaining the resilient valve seal. Thus, during operation of the actuator, the forces are transmitted through the metal parts 86 and 54 or 88 and 54 and the resilient valve seat 80 is therefore not required to transmit any of the braking forces.

In addition to the foregoing, it will be seen that valve seat 86 has a through bore which provides an annular inlet passage 89 around the plunger 38 for connecting the inlet chamber 56 with the pressure chamber 28 when the inlet valve 84 is opened, see FIG. 4. In order to throttle or meter the flow of compressed air to the pressure chamber 28 and thus prevent any tendency of the actuator from over-travel as the inlet valve is initially opened, the right end of the plunger 38 is slightly enlarged to form a head 90 which is provided with a sloping shoulder 92. Thus, as the inlet valve 84 is moved to the open position of FIG. 4, communication between the chambers 56 and 28 is gradually established so that any abrupt build-up of air pressure within the chamber 28, which might cause over-travel of the piston 24, is avoided. It will be understood that the enlarged end 90 has a diameter less than the bore defining the annular inlet passage 89, thus ensuring communication between the pressure chamber 28 and the exhaust bore 64 when the exhaust valve 82 is open, as in FIG. 3.

In operation, and with the parts in the normal released position as shown in FIG. 1, it will be seen that the initial pedal reaction is a function of the relatively light springs 42 and 68 and the action of the air pressure within the chamber 56 acting upon the valve head 54. This reaction is relatively slight and remains substantially constant as the brakes are relatively lightly applied.

More particularly, as the plunger 38 is moved to the right, the exhaust valve seat 88 will contact the exhaust valve 82 and close off communication between the pressure chamber 28 and the atmospheric chamber 29 by way of passage 89, bore 64 and passage 66. Continued movement of the plunger 38 moves the valve plunger 50 to the position shown in FIG. 4 so that the inlet valve 84 is opened and communication is established between the pressure chamber 28 and the inlet chamber 56. When this is effected, compressed air from a suitable supply is gradually metered past the head 90 and shoulder 92 to the inlet passage 89 and pressure chamber 28 in order to move the piston 24 against the return spring 46. The sleeve 30 and plunger 32 will thereupon displace hydraulic fluid from the master cylinder 12 to take up the slack in the vehicle brakes and effect a relatively light brake application. Since the control valve mechanism is of the follow-up type, it will be clear that when movement of the plunger ceases, the inlet valve seat 86, which is carried by the piston 24, will close the inlet valve 84. At this time, the control valve will be in lapped condition and the brakes will be maintained in lightly applied condition and the pedal reaction will be relatively slight.

In the event that more braking effort is required, the the plunger 38 is again moved to the right to open the intake valve 84 and increase the pressure within the chamber 28. As the pressure within the master cylinder 12 and in the hydraulic brake system is increased, the reaction force acting on the hydraulic plunger 32 is likewise increased and finally reaches a point where it overcomes the tension of the spring 70. When this occurs, the plunger 32 moves to the left, as viewed in FIG. 1, to contact the right end of the valve plunger 50. This transfers the hydraulic reaction from the piston 24 to the manually operable plunger 38 so that an immediate increase in pedal reaction is felt by the operator, which continues to increase as the braking effort is intensified. Upon release of the pedal and plunger 38, the exhaust valve 82 will be opened, as seen in FIG. 3, and the parts will be promptly returned to the position illustrated in FIG. 1.

In the event of failure of the source of compressed air, it will be understood that as the plunger 38 is moved to the right, the collar 44 will engage the valve seat 86 and effect manual movement of the power piston 24 and the hydraulic piston constituted by the plunger 32 and sleeve 30 to apply the brakes.

From the foregoing, it will be readily seen that the provision of the hydraulic plunger 32 and the spring 70 secures a highly effective pedal reaction which is similar to that encountered in manually operable braking systems having no power assist. Up to the point of compression of the spring 70, the reaction is relatively slight and operation of the novel power actuator of the invention during this phase of brake application is such as to cause a relatively light braking effort. The second phase of the operation is effected when the plunger 32 contacts the valve plunger 50, and when this occurs, the pedal reaction is intensified in proportion to the increased braking effort.

A further feature of the invention resides in the novel control valve mechanism which provides resilient intake and exhaust valves, so arranged as to function as efficient seals in the control of the actuator. The provision of the head 90 and shoulder 92 also constitutes an important aspect of the invention in the metering of the air flow to the actuator to prevent any tendency toward over-travel.

In addition to the above, the arrangement of the resilient valve seat 80 is such that efficient valve seals are provided by the ridges 82 and 84 while relieving them of the transmission of braking forces, the latter being transmitted through metal parts which are in contact with each other.

While a preferred form of the invention has been shown and described herein, it will be readily apparent to those skilled in the art that various modifications may be resorted to without departing from the spirit of the invention. Reference will therefore be had to the appended claims for a definition of the limits of the invention.

What is claimed is:

1. An air hydraulic actuator comprising a power cylinder having a piston therein dividing the cylinder into atmospheric and pressure chambers, said piston having a central bore therein, a hydraulic master cylinder positioned at one end of the power cylinder, a hollow sleeve connected with said piston and having an end positioned within the master cylinder, a reaction plunger within said sleeve and having one end thereof positioned in the master cylinder and responsive to master cylinder pressure, passage means in said piston for conducting compressed air to said central bore, means including a valve plunger slideably mounted within said bore and sleeve for controlling the application of compressed air from said bore to said pressure chamber and from the latter to the atmospheric chamber for causing power operation of said piston, sleeve and reaction plunger, said valve plunger having one end positioned adjacent the other end of said reaction plunger, a solid plunger slideably mounted in said power cylinder at the other end thereof and having one end thereof projecting into said bore and being normally spaced from the other end of the valve plunger and manually movable to engage and move the valve plunger, and resilient means for normally separating the adjacent ends of the reaction plunger and the valve control plunger and yieldable in response to a predetermined pressure in the master cylinder to allow said ends to contact each other to conduct the reaction force due to master cylinder pressure to the manually movable plunger.

2. The actuator of claim 1 wherein said bore comprises an inlet chamber in said piston, and the valve plunger is provided with an enlarged valve head positioned in said inlet chamber.

3. The actuator of claim 2 which comprises in addition, an annular resilient valve member carried by the valve head and having a pair of spaced-apart, annular, concentric ridges projecting therefrom.

4. The actuator of claim 3 wherein one of the ridges is an inlet valve and cooperates with a valve seat carried by the piston, and the other ridge is an exhaust valve and cooperates with an end of said solid plunger.

5. An air hydraulic actuator comprising a power cylinder having a piston therein dividing the cylinder into atmospheric and pressure chambers, a hydraulic master cylinder positioned at one end of the power cylinder, a hollow sleeve connected with said piston and having an end positioned within the master cylinder, a reaction plunger within said sleeve and having one end thereof positioned in the master cylinder and responsive to master cylinder pressure, said piston having a centrally positioned inlet chamber therein, means including a valve plunger slidably mounted within said sleeve for controlling the application of compressed air to and from said pressure chamber for causing power operation of said piston, sleeve and reaction plunger, said valve plunger having one end positioned adjacent the other end of said reaction plunger, an annular inlet valve seat carried by the central portion of said piston and provided with a bore, passage means in said piston for conducting compressed air to said inlet chamber, said valve plunger having a passage therethrough and also having an enlarged valve head movable in said inlet chamber for alternately connecting said inlet chamber with said bore and the bore with said passage, means for connecting said passage with the atmospheric chamber, a resilient, annular valve member carried by said valve head and having a pair of spaced-apart, annular concentric ridges projecting therefrom, a spring interposed between the adjacent ends of the reaction plunger and the valve plunger for normally maintaining one of said ridges in contact with the inlet valve seat, a manually movable solid plunger slidably mounted in said power cylinder at the other end thereof and having an end portion loosely mounted in said bore, said end portion being positioned to contact the other of said ridges to close the passage through the valve plunger, and resilient means for normally separating the adjacent ends of the reaction plunger and the valve plunger and yieldable in response to a predetermined pressure in the master cylinder to allow said ends to contact each other to conduct the reaction force due to master cylinder pressure to the manually movable plunger.

6. An air hydraulic actuator comprising a power cylinder having a piston therein dividing the cylinder into atmospheric and pressure chambers, a hydraulic master cylinder positioned at one end of the power cylinder, a hollow sleeve connected with said piston and having an end positioned within the master cylinder, a reaction plunger within said sleeve and having one end thereof positioned in the master cylinder and responsive to master cylinder pressure, said piston having a centrally positioned inlet chamber therein, means including a valve plunger slidably mounted within said sleeve for controlling the application of compressed air to and from said pressure chamber for causing power operation of said piston, sleeve and reaction plunger, said valve plunger having one end positioned adjacent the other end of said reaction plunger, an annular inlet valve seat carried by the central portion of said piston and provided with a bore, passage means in said piston for conducting compressed air to said inlet chamber, said valve plunger having a passage therethrough and also having an enlarged valve head movable in said inlet chamber for alternately connecting said inlet chamber with said bore and the bore with said passage, means for connecting said passage with the atmospheric chamber, a resilient, annular valve member carried by said valve head and having a pair of spaced-apart, annular, concentric ridges projecting therefrom, a spring interposed between the adjacent ends of the reaction plunger and the valve plunger for normally maintaining one of said ridges in contact with the inlet valve seat, a manually movable solid plunger slideably mounted in said power cylinder at the other end thereof and having an end portion loosely mounted in said bore, said end portion being positioned to contact the other of said ridges to close the passage through the valve plunger and move said one ridge off the inlet valve seat to establish communication between said bore and the inlet chamber, said end portion being formed to gradually meter the last named communication, and resilient means for normally separating the adjacent ends of the reaction plunger and the valve plunger and yieldable in response to a predetermined pressure in the master cylinder to allow said ends to contact each other to conduct the reaction force due to master cylinder pressure to the manually movable plunger.

7. An air hydraulic actuator comprising a power cylinder having a piston therein dividing the cylinder into atmospheric and pressure chambers, a hydraulic master cylinder positioned at one end of the power cylinder, a hollow sleeve connected with said piston and having an end positioned within the master cylinder, a reaction plunger within said sleeve and having one end thereof positioned in the master cylinder and responsive to master cylinder pressure, said piston having a centrally positioned inlet chamber therein, means including a valve plunger slideably mounted within said sleeve for controlling the application of compressed air to and from said pressure chamber for causing power operation of said piston, sleeve and reaction plunger, said valve plunger having one end positioned adjacent the other end of said reaction plunger, an annular inlet valve seat carried by the central portion of said piston and provided with a bore, passage means in said piston for conducting compressed air to said inlet chamber, said valve plunger having a passage therethrough and also having an enlarged valve head movable in said inlet chamber for alternately connecting said inlet chamber with said bore and the bore with said passage, means for connecting said passage with the atmospheric chamber, a resilient, annular valve member carried by said valve head and having a pair of spaced-apart, annular, concentric ridges projecting therefrom, a spring interposed between the adjacent ends of the reaction plunger and the valve plunger for normally maintaining one of said ridges in contact with the inlet valve seat, a manually movable solid plunger slideably mounted in said power cylinder at the other end thereof and having an end portion loosely mounted in said bore, said end portion being positioned to contact the other of said ridges to close the passage through the valve plunger and move said one ridge off the inlet valve seat to establish communication between said bore and the inlet chamber, said end portion having a peripheral enlargement and an annular sloping shoulder to gradually meter the flow of air from the inlet chamber to said passage.

References Cited in the file of this patent
UNITED STATES PATENTS

| | | |
|---|---|---|
| 2,735,268 | Stelzer | Feb. 21, 1956 |
| 2,763,989 | Ayers | Sept. 25, 1956 |
| 2,766,732 | Schultz | Oct. 16, 1956 |
| 2,792,686 | Ingres | May 21, 1957 |
| 2,807,239 | Grant | Sept. 24, 1957 |
| 2,812,639 | Whitten | Nov. 12, 1957 |